J. B. PATTERSON.
SUSPENSION COUCH.
APPLICATION FILED APR. 11, 1908.

973,382.

Patented Oct. 18, 1910.

WITNESSES:
Robt R Kitchel
Frank E French

INVENTOR
James B Patterson.
BY
Augustus B Stoughton
ATTORNEY.

UNITED STATES PATENT OFFICE.

JAMES B. PATTERSON, OF PHILADELPHIA, PENNSYLVANIA.

SUSPENSION-COUCH.

973,382.  Specification of Letters Patent.  Patented Oct. 18, 1910.

Application filed April 11, 1908. Serial No. 426,459.

*To all whom it may concern:*

Be it known that I, JAMES B. PATTERSON, a citizen of the United States, and a resident of Philadelphia, in the county of Philadelphia and State of Pennsylvania, have invented certain new and useful Improvements in Suspension-Couches, of which the following is a specification.

Objects of the present invention are to provide a suspension couch with corner pieces or pillow supports and to make the same capable of use not only for that purpose, but also for use as pockets for the reception of various articles that may be useful for the occupant.

Another object of the invention is to otherwise improve the end portion of the suspension couch more particularly in regard to its suspension arrangements which are made readily detachable, but also very strong.

The invention will be claimed at the end of this specification and an embodiment of it will be described in connection with the accompanying drawings forming part hereof, and in which—

Figure 1:
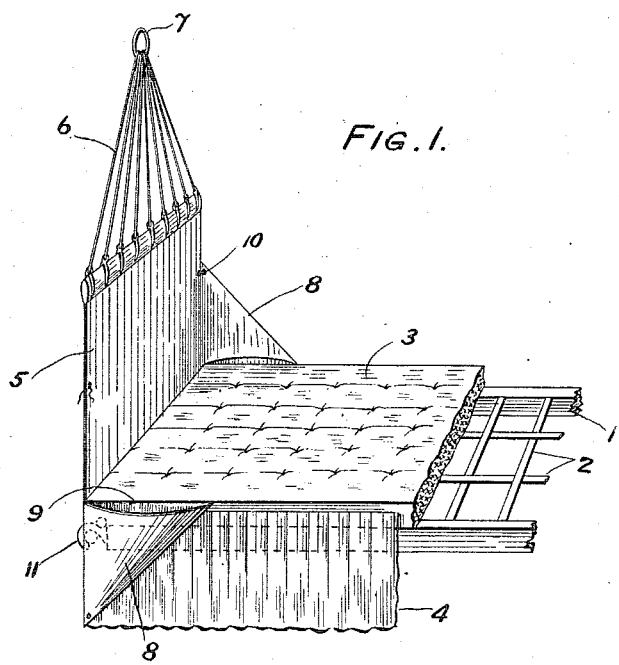
Figure 2:
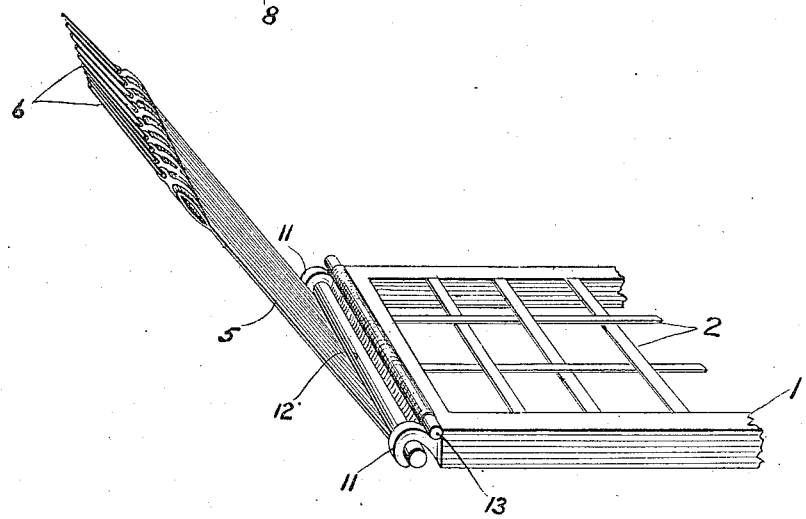

Figure 1, is a perspective view illustrating a suspension couch embodying features of the invention, and Fig. 2, is a similar view illustrating suspension means embodying features of the invention.

In the drawings 1, is the frame of the couch and it is shown to consist of side and end pieces with metallic slats 2, arranged cross-wise between them.

3, is a cushion or mattress arranged on the frame and from it depends a valance 4.

5, are end suspension pieces to which are connected suspension cords or the like 6, that radiate from a ring 7.

8, are corner pieces which are attached to the couch side 9 and may be secured to the end suspension pieces 5, as shown at the back of Fig. 1, for example, by means of cords and gromets 10. When thus arranged they constitute a support for preventing a pillow or the like from falling off the couch. These corner pieces are triangular in shape and they are made of two thicknesses of material and are open at the edge where they join the couch side and thus form pockets, which when the corner pieces are turned down, as shown at the front of Fig. 1, are readily accessible.

At the ends of the frame there are hooks 11, which have their bills turned downward. A pole 12, is engaged by these hooks, and the end suspension piece 5, passes under this pole 12 and are provided with a spreader 13, the ends of which may overlie the shanks of the hooks and which binds between the pole 12 and the end of the frame. The spreader 13, passes through a hem or the like at the end of the suspension piece. Thus there is formed a strong attachment between the end piece and the frame, and one which may be readily disconnected whenever it is necessary or desirable to do so.

What I claim is:

1. A suspension couch comprising a frame having at its ends hooks of which the bills are arranged toward the bottom of the frame, a pole in the bills of the hooks, and end suspension pieces arranged under the pole and provided with a spreader by which they are held to the frame, substantially as described.

2. In a suspension couch the combination with the end suspension piece and couch side of a triangular corner piece consisting of a doubled fabric and open along one edge and adapted for attachment to the couch side and to the end piece to form a pillow holder and to hang down from the couch side and form a pocket, substantially as described.

3. A suspension couch comprising a frame having poles at its ends and end suspension pieces arranged under the poles and provided with spreaders by which they are held to the frame, substantially as described.

In testimony whereof I have hereunto signed my name.

JAMES B. PATTERSON.

Witnesses:
CLIFFORD K. CASSEL,
FRANK E. FRENCH.